United States Patent
Mori (10) Patent No.: US 8,054,348 B2
(45) Date of Patent: Nov. 8, 2011

(54) NOISE REDUCTION DEVICE AND DIGITAL CAMERA

(75) Inventor: Munehiro Mori, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 482 days.

(21) Appl. No.: 12/394,469

(22) Filed: Feb. 27, 2009

(65) Prior Publication Data
US 2009/0237532 A1 Sep. 24, 2009

(30) Foreign Application Priority Data
Mar. 24, 2008 (JP) .................................. 2008-075048

(51) Int. Cl.
 *H04N 9/64* (2006.01)
 *H04N 5/217* (2011.01)
(52) U.S. Cl. ........................................ 348/246; 348/241
(58) Field of Classification Search .................. 348/241, 348/246, 247
See application file for complete search history.

(56) References Cited

U.S. PATENT DOCUMENTS
2004/0032516 A1 * 2/2004 Kakarala ....................... 348/246

FOREIGN PATENT DOCUMENTS
JP 2001-144996 5/2001
JP 2006-238060 9/2006

* cited by examiner

*Primary Examiner* — Alicia M Harrington
(74) *Attorney, Agent, or Firm* — Oblon, Spivak, McClelland, Maier & Neustadt, L.L.P.

(57) ABSTRACT

The first array register stores neighboring pixels of the same color as the pixel of interest, which are sorted according to the size of the pixel value. The maximum signal comparison circuit compares the value obtained by adding the threshold ThB to the pixel value maxC, which is the (b1)th largest pixel value of the pixels in the first array register and the pixel value P22 of the pixel of interest. When the comparison shows that the pixel value of the pixel of interest P22 is larger, the pixel of interest P22 is determined to be noise, and the pixel value of the pixel of interest is replaced by maxC. The limit signal comparison circuit compares the pixel value P22 of the pixel of interest and the signal upper limit LB. When the comparison shows that P22 is larger than LB and is equal to or larger than maxC, only the pixel of interest is determined to be totally overexposed, and the pixel value of the pixel of interest is replaced by maxC.

15 Claims, 8 Drawing Sheets

NOISE REDUCTION DEVICE AND DIGITAL CAMERA

BACKGROUND OF THE INVENTION

1. Field of the Invention

The present invention relates to a technology for reducing noise in image signals acquired by an image pickup device or the like.

2. Description of the Background Art

With the increasing number of pixels in image pickup devices used in digital cameras, digital movie cameras, and the like, the light receiving area per pixel is becoming smaller and smaller. The reduction in the light receiving area per pixel in an image pickup device causes a decrease in the light receiving sensitivity, and hence, in the signal-to-noise ratio of the captured pixel signal.

An image pickup device having a color filter array known as a single Bayer array outputs an image signal having only one color component per pixel. Therefore, a digital camera having such an image pickup device requires pixel interpolation in which each pixel is converted into a pixel having all color components of the color space.

Under such circumstances in which the light receiving sensitivity of the image pickup device is decreasing, it is essential to perform noise reduction so as to improve the signal-to-noise ratio of pixel signals. In order to eliminate the adverse effect of noise in image signals, it is effective to apply noise reduction to data not yet subjected to pixel interpolation, that is, RAW data.

As described above, it is effective to apply noise reduction to RAW data; however, when the noise reduction is too strong the RAW data loses its original information, thereby possibly causing a decrease in the resolution feeling or other adverse effects.

Such adverse effects are remarkable especially when noise reduction is performed with a well-known filter such as a median filter.

In Japanese Patent Application Laid Open Gazette No. 2006-238060, noise reduction is performed by determining RGB signal levels independently of each other. For example, in the case of R signals, the level difference between a pixel of interest and a neighboring pixel is calculated, and when the level difference exceeds a threshold, the pixel value of the pixel of interest is replaced by the pixel value of the neighboring pixel.

Even the method disclosed in Japanese Patent Application Laid Open Gazette No. 2006-238060 may erroneously replace the pixel value of a high luminance pixel by the pixel value of a neighboring pixel.

In Japanese Patent Application Laid Open Gazette No. 2001-144996, it is determined whether a pixel of interest is a contour component based on the color difference between the pixel of interest and a reference pixel. When the pixel of interest is determined to be a contour component, a median filter is used; otherwise, a smoothing filter is used.

SUMMARY OF THE INVENTION

The present invention relates to a noise reduction device for receiving a pixel signal of a predetermined color space having one color component per pixel and for reducing noise in a pixel of interest. The noise reduction device includes an element for previously setting the highest rank of the same color as the pixel of interest; an element for acquiring neighboring pixels of the same color as the pixel of interest, the neighboring pixels of the same color being located within a predetermined vicinity of the pixel of interest; an element for storing an arrangement of the neighboring pixels of the same color sorted according to the size of the pixel value; and a correction element for replacing the pixel value of the pixel of interest by the pixel value of the highest rank of the same color when the pixel value of the pixel of interest is larger by a maximum width threshold than the pixel value of the highest rank of the same color in the arrangement of the neighboring pixels of the same color.

Setting the highest rank can reduce noise in the pixel of interest while eliminating the effect of noise in the neighboring pixels. Furthermore, providing the maximum width threshold can maintain the pixel value of the pixel of interest when it is slightly larger than the maximum pixel value, thereby maintaining the resolution feeling of the image.

The noise reduction device of the present invention may also include an element for previously setting the lowest rank of the same color as the pixel of interest; an element for acquiring neighboring pixels of the same color as the pixel of interest, the neighboring pixels of the same color being located within a predetermined vicinity of the pixel of interest; an element for storing an arrangement of the neighboring pixels of the same color sorted according to the size of the pixel value; and a correction element for replacing the pixel value of the pixel of interest by the pixel value of the lowest rank of the same color when the pixel value of the pixel of interest is smaller by a minimum width threshold than the pixel value of the lowest rank of the same color in the arrangement of the neighboring pixels of the same color.

Setting the lowest rank can reduce noise in the pixel of interest while eliminating the effect of noise in the neighboring pixels. Furthermore, providing the minimum width threshold can maintain the pixel value of the pixel of interest when it is slightly smaller than the minimum pixel value, thereby maintaining the resolution feeling of the image.

The noise reduction device of the present invention may also include an element for previously setting the highest rank and the lowest rank of the different color from the pixel of interest; an element for acquiring neighboring pixels of the different color from the pixel of interest, the neighboring pixels of the different color being located within a predetermined vicinity of the pixel of interest; and an element for storing an arrangement of the neighboring pixels of the different color sorted according to the size of the pixel value, wherein: noise reduction is not applied to the pixel of interest and the pixel value of the pixel of interest is maintained when the difference between the pixel value of the highest rank of the different color and the pixel value of the lowest rank of the different color in the arrangement of the neighboring pixels of the different color is larger than a dynamic threshold.

Noise reduction is not applied to the region with high pixel variation and with the high possibility of including a high-frequency component in the subject, so that the resolution feeling of the image can be maintained.

Thus, an object of the present invention is to provide a technique for reducing noise effectively without damaging the resolution feeling of images.

These and other objects, features, aspects and advantages of the present invention will become more apparent from the following detailed description of the present invention when taken in conjunction with the accompanying drawings.

DESCRIPTION OF THE PREFERRED EMBODIMENTS

<1. The Overall Structure of the Digital Camera and the Outline of the Process>

Figure 1:
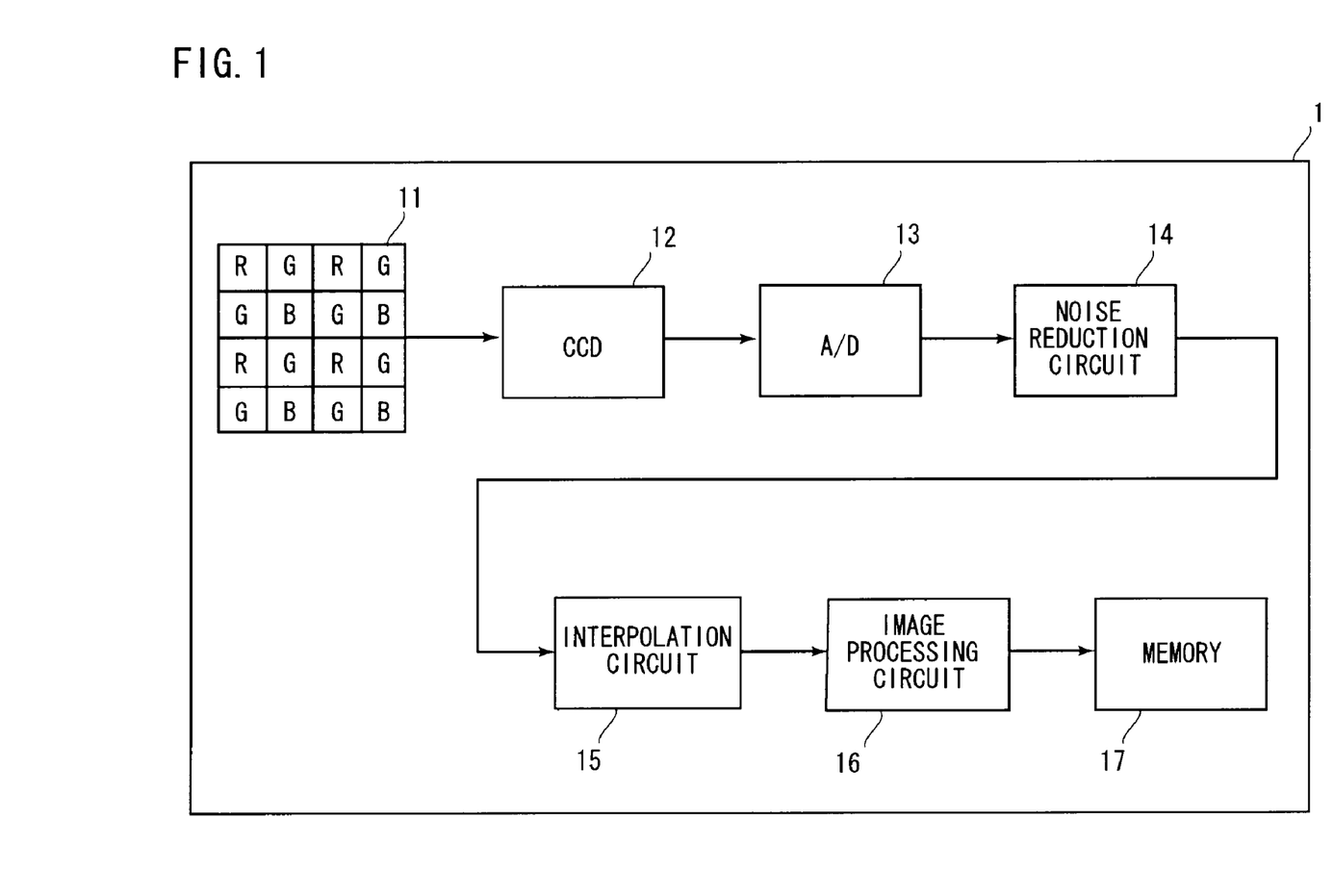
FIG. 1 is a circuit block diagram of a digital camera according to an embodiment.

The embodiment of the present invention will be described as follows with reference to drawings. FIG. 1 is a block diagram of a digital camera 1 according to the embodiment. The digital camera 1 includes a color filter array 11, a CCD (Charge Coupled Device) 12, an A/D converter 13, a noise reduction circuit 14, an interpolation circuit 15, an image processing circuit 16, and a memory 17.

The CCD 12 having the color filter array 11, which is an RGB Bayer array, captures and produces a subject image through an unillustrated optical system. The CCD 12 outputs an analog pixel signal, which is converted into a digital pixel signal by the A/D converter 13. As the image pickup device, a CMOS sensor can be used instead of the CCD. The color filter array can be a complementary filter.

The pixel signal thus digital-converted by the A/D converter 13 is subjected to noise reduction by the noise reduction circuit 14. The noise reduction circuit 14 performs arithmetic processing using the pixel signal of the pixel of interest and the pixel signals of neighboring pixels so as to reduce noise in the pixel of interest. The noise reduction, which is characteristic of the present invention, will be described in detail later.

The color filter array 11 is an RGB Bayer array, and therefore, the pixel signal outputted from the A/D converter 13 is a signal having only one color component of red, green, or blue per pixel. After being subjected to noise reduction, this pixel signal is interpolated by the interpolation circuit 15 and converted into a pixel signal having the color components of all of red, green, and blue per pixel. Thus, the noise reduction circuit 14 applies noise reduction to RAW data before the data is subjected to pixel interpolation, thereby effectively eliminating the effect of noise in pixel signals.

The pixel signal pixel-interpolated by the interpolation circuit 15 is inputted to the image processing circuit 16. In the image processing circuit 16, the pixel signal is subjected to color correction in order to improve color reproducibility, gamma correction, color space conversion, and the like. The color space conversion converts, for example, an RGB color space into a YCbCr color space.

The pixel signal subjected to color space conversion is stored in the memory 17. The pixel signal is then, for example, compression-coded, and stored as captured image data such as JPEG in a storage medium such as a flash memory. Alternatively, the captured image data may be outputted to a liquid crystal display monitor of the digital camera 1.

<2. Illustration of Bayer Array Pixels>

Figure 2A:
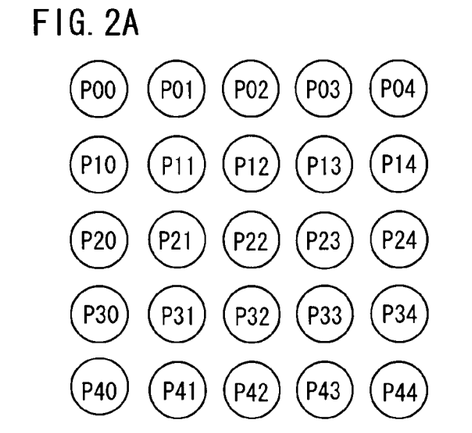
FIG. 2 shows pixel matrix patterns.

Bayer array pixels are illustrated as follows in the embodiment and in the drawings. The pixels in a 5×5 matrix are shown in FIG. 2A. The symbol "P" in FIG. 2A indicates that it does not matter whether the pixel is a color component of red, green, or blue. In FIGS. 2B to 2E, on the other hand, the pixels are distinguished by color. The symbols R, G, and B indicate red pixels, green pixels, and blue pixels, respectively. In FIGS. 2B to 2E, G pixels are shown in solid circles, and R and B pixels are shown in dashed circles.

The first and second digits beside the symbol P, R, C, or B indicate a row number, and a column number, respectively, of the pixels in the matrix. FIGS. 2A to 2E each show a pixel arrangement of a matrix consisting of 25 pixels: P00 to P44 including a pixel of interest P22. The pixels are shown in the same manner in the other drawings. The symbol "P" sometimes represents a pixel value in the description of the embodiment and in the mathematical formulas. For example, the symbol P11 may represent a pixel itself in the first row and first column and may also represent the pixel value of the pixel.

Figure 2B:
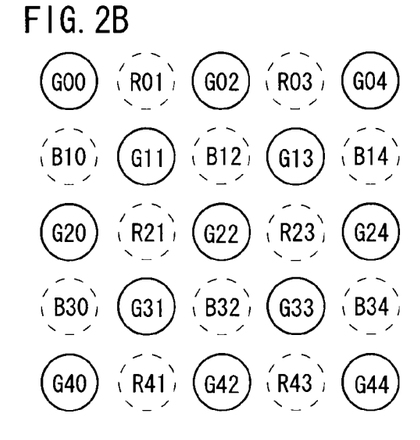
Figure 2C:
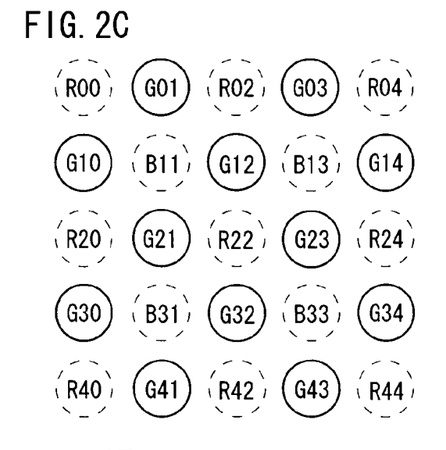
Figure 2D:
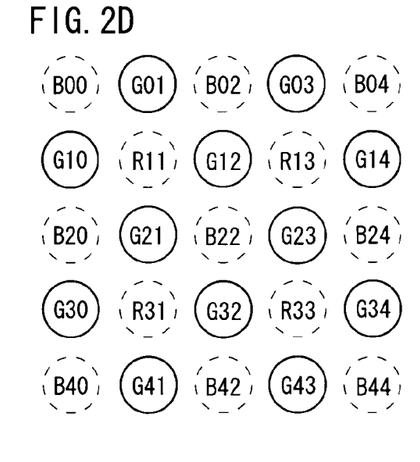
Figure 2E:
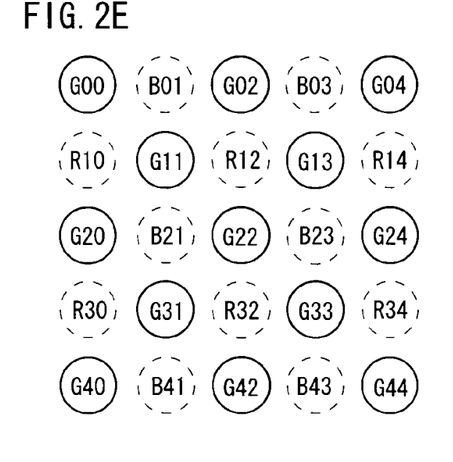

FIGS. 2B and 2E each show a pixel arrangement when the pixel of interest P22 is a G pixel. FIG. 2C shows a pixel arrangement when the pixel of interest P22 is an R pixel. FIG. 2D shows a pixel arrangement when the pixel of interest P22 is a B pixel. In the noise reduction circuit 14, as described above, the pixel signals in the matrix are stored in a register group in order to perform arithmetic processing using the pixel signal of the pixel of interest and the pixel signals of neighboring pixels. When the pixels in a 5×5 matrix are the target of processing, the pixel signals to be stored in the register group can be arranged in four patterns shown in FIGS. 2B to 2E. When the pixels in a 3×3 matrix are the target of processing, the pixel of interest P22 and its eight neighboring pixels: P11, P12, P13, P21, P23, P31, P32, and P33 are used. These pixel signals can also be arranged in four patterns shown in FIGS. 2B to 2E.

In the embodiment, the G pixels arranged alternately with the R pixels in the row direction are distinguished from the G pixels arranged alternately with the B pixels in the row direction. For example, in FIG. 2B, the G pixels in the even rows including pixels G00, G02, G04, G20, G22, G24, G40, G42, and G44 (G pixels arranged alternately with R pixels) are treated as a different color from the G pixels in the odd rows including pixels G11, G13, G31, and G33 (G pixels arranged alternately with B pixels).

<3. Noise Reduction Process>

Figure 3:
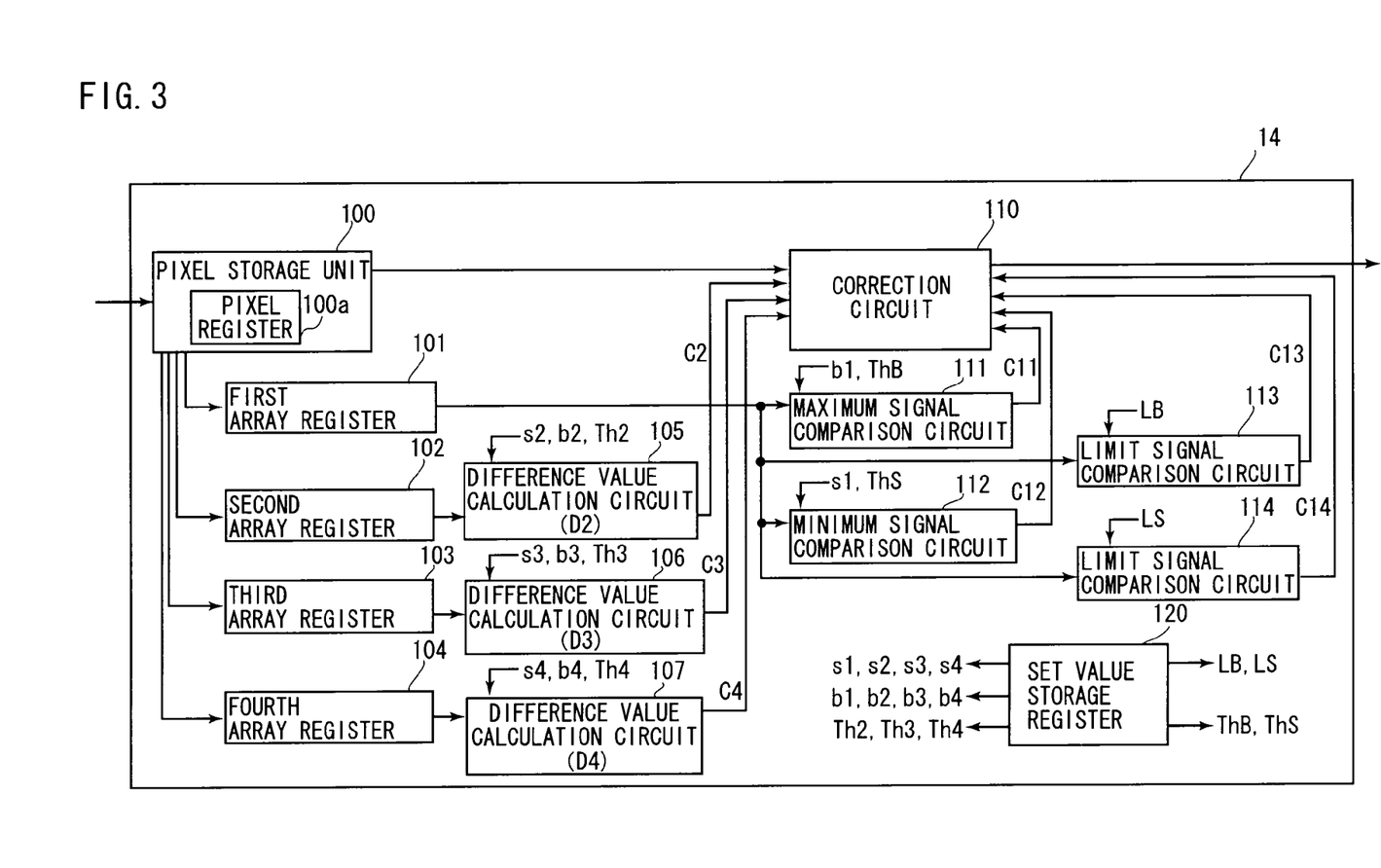
FIG. 3 is a circuit block diagram of a noise reduction circuit.

The following is a description of the structure of the noise reduction circuit 14. FIG. 3 is a circuit block diagram of the noise reduction circuit 14.

The noise reduction circuit 14 includes a pixel storage unit 100, a first array register 101, a second array register 102, a third array register 103, and a fourth array register 104. The pixel storage unit 100 includes a pixel register 100a consisting of a group of 25 registers for storing a 5×5 pixel matrix. The pixel storage unit 100 further includes a line memory for storing pixel signals.

The noise reduction circuit 14 includes a correction circuit 110, a maximum signal comparison circuit 111, a minimum signal comparison circuit 112, a limit signal comparison circuit 113, and a limit signal comparison circuit 114. The correction circuit 110 determines whether noise reduction should be made effective or ineffective, replaces the pixel value of the pixel of interest P22 by the pixel value of another pixel for the purpose of noise reduction, and performs other processes.

<3-1. Process for Making Noise Reduction Effective>

Before describing a noise reduction process, a process for making noise reduction effective is described first. The noise reduction circuit 14 determines whether noise reduction should be made effective or ineffective by referring to the difference value of pixels that are in the vicinity of the pixel of interest and have different color signals from the pixel of interest. When noise reduction is determined to be ineffective, the correction circuit 110 outputs a pixel signal without performing noise reduction.

The pixel storage unit 100 stores the pixel signals of an RGB Bayer array outputted from the A/D converter 13. The pixel register 100a stores a 5×5 pixel matrix including the pixel of interest P22. As described above, the pixel matrix stored in the pixel register 100a can be arranged in four patterns shown in FIGS. 2B to 2E.

The first array register 101 stores pixels having the same color (first color) as the pixel of interest P22 of the 25 pixels stored in the pixel register 100a. The pixels having the same color as the pixel of interest P22 are sorted according to the size of the pixel value when stored in the first array register 101.

Figure 4:
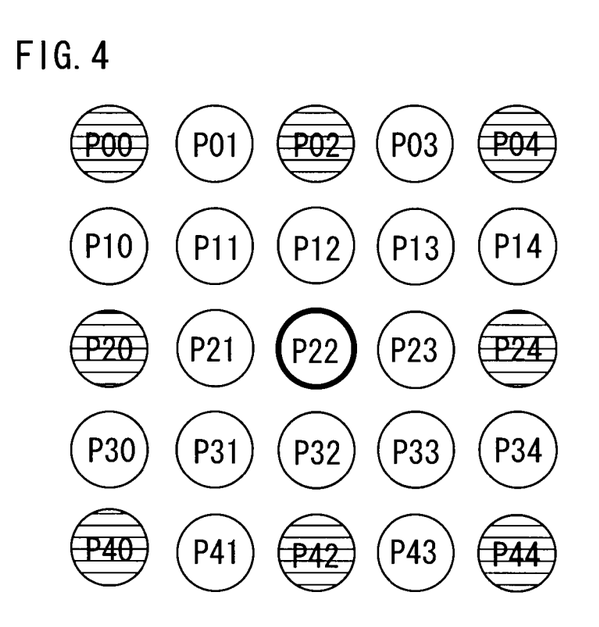
FIG. 4 shows a pixel arrangement of the same color (first color) as the pixel of interest.

In FIG. 4, eight pixels to be stored in the first array register 101 are shown with a hatch pattern.

When the pixel register 100a stores, for example, the pixel matrix arranged in the pattern shown in FIG. 2B, the first array register 101 stores the pixels G00, G02, G04, G20, G24, G40, G42, and G44, which are sorted according to the size of the pixel value as the pixels of the first color (G color pixels in the even rows).

The second array register 102 stores pixels of the second color, different from the color of the pixel of interest P22 of the 25 pixels stored in the pixel register 100a. The pixels of the second color are sorted according to the size of the pixel value when stored in the second array register 102.

Figure 5:
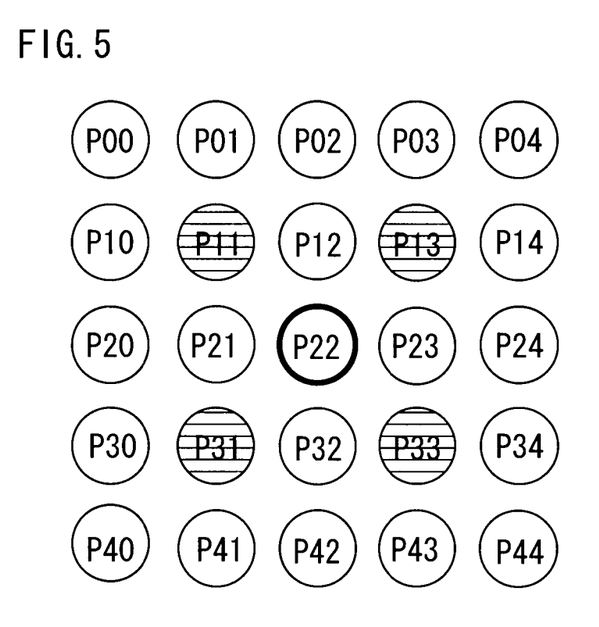
FIG. 5 shows a pixel arrangement of a second color different from the color of the pixel of interest.

In FIG. 5, four pixels of the second color to be stored in the second array register 102 are shown with a hatch pattern.

When the pixel register 100a stores, for example, the pixel matrix arranged in the pattern shown in FIG. 2B, the second array register 102 stores the pixels G11, G13, G31, and G33, which are sorted according to the size of the pixel value as the pixels of the second color (G color pixels in the odd rows).

The third array register 103 stores pixels of the third color, different from the color of the pixel of interest P22 of the 25 pixels stored in the pixel register 100a. The pixels of the third color are sorted according to the size of the pixel value when stored in the third array register 103.

Figure 6:
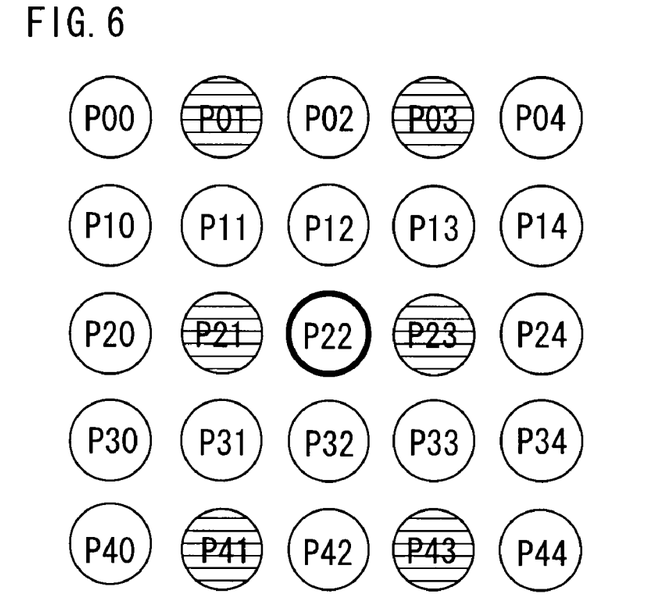
FIG. 6 shows a pixel arrangement of a third color different from the color of the pixel of interest.

In FIG. 6, six pixels of the third color to be stored in the third array register 103 are shown with a hatch pattern.

When the pixel register 100a stores, for example, the pixel matrix arranged in the pattern shown in FIG. 2B, the third array register 103 stores the pixels R01, R03, R21, R23, R41, and R43, which are sorted according to the size of the pixel value as the pixels of the third color (R color pixels).

The fourth array register 104 stores pixels of the fourth color, different from the color of the pixel of interest P22 of the 25 pixels stored in the pixel register 100a. The pixels of the fourth color are sorted according to the size of the pixel value when stored in the fourth array register 104.

Figure 7:
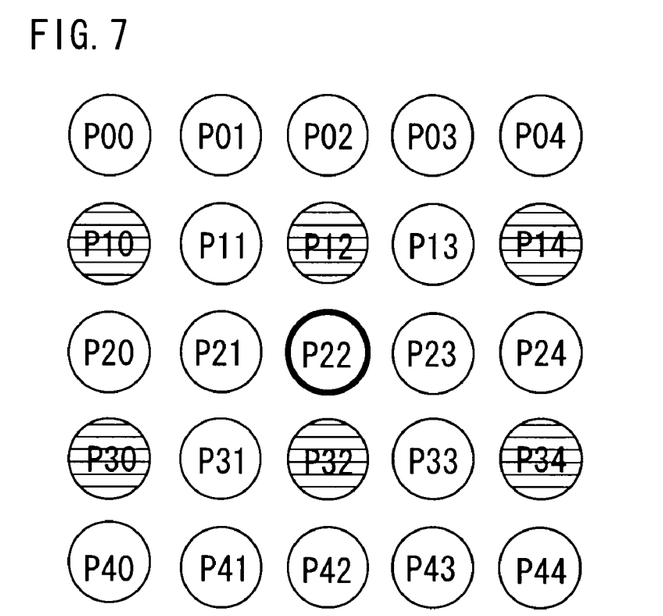
FIG. 7 shows a pixel arrangement of a fourth color different from the color of the pixel of interest.

In FIG. 7, six pixels of the fourth color to be stored in the fourth array register 104 are shown with a hatch pattern.

When the pixel register 100a stores, for example, the pixel matrix arranged in the pattern shown in FIG. 2B, the fourth array register 104 stores the pixels B10, B12, B14, B30, B32, and B34, which are sorted according to the size of the pixel value as the pixels of the fourth color (B color pixels).

The difference value calculation circuit 105 calculates a difference value D2 of the pixels of the second color stored in the second array register 102. The difference value D2 is a value obtained by subtracting the minimum pixel value from the maximum pixel value of the pixels of the second color stored in the second array register 102.

The maximum pixel value indicates the (b2)th largest pixel value of the pixels of the second color stored in the second array register 102. The set value b2 is stored in a set value storage register 120. The minimum pixel value indicates the (s2)th smallest pixel value of the pixels of the second color stored in the second array register 102. The set value s2 is stored in the set value storage register 120.

For example, when the set value b2=2 and the set value s2=2, the maximum pixel value is the second largest pixel value, and the minimum pixel value is the second smallest pixel value of the pixels of the second color. In this case, the difference value D2 is a value obtained by subtracting the second smallest pixel value from the second largest pixel value. Thus using the set values b2 and s2 prevents the pixels having the maximum and minimum pixel values from being affected by noise when pixels of the second color contain noise.

The difference value calculation circuit 106 calculates a difference value D3 of the pixels of the third color stored in the third array register 103. The difference value D3 is a value obtained by subtracting the minimum pixel value from the maximum pixel value of the pixels of the third color stored in the third array register 103.

The maximum pixel value indicates the (b3)th largest pixel value of the pixels of the third color stored in the third array register 103. The set value b3 is stored in the set value storage register 120. The minimum pixel value indicates the (s3)th smallest pixel value of the pixels of the third color stored in the third array register 103. The set value s3 is stored in the set value storage register 120.

For example, when the set value b3=2 and the set value s3=2, the maximum pixel value is the second largest pixel value, and the minimum pixel value is the second smallest pixel value of the pixels of the third color. In this case, the difference value D3 is a value obtained by subtracting the second smallest pixel value from the second largest pixel value. Thus using the set values b3 and s3 prevents the pixels having the maximum and minimum pixel values from being affected by noise when pixels of the third color contain noise.

The difference value calculation circuit 107 calculates a difference value D4 of the pixels of the fourth color stored in the fourth array register 104. The difference value D4 is a value obtained by subtracting the minimum pixel value from the maximum pixel value of the pixels of the fourth color stored in the fourth array register 104.

The maximum pixel value indicates the (b4)th largest pixel value of the pixels of the fourth color stored in the fourth array register 104. The set value b4 is stored in the set value storage register 120. The minimum pixel value indicates the (s4)th smallest pixel value of the pixels of the fourth color stored in the fourth array register 104. The set value s4 is stored in the set value storage register 120.

For example, when the set value b4=2 and the set value s4=2, the maximum pixel value is the second largest pixel value, and the minimum pixel value is the second smallest pixel value of the pixels of the fourth color. In this case, the difference value D4 is a value obtained by subtracting the second smallest pixel value from the second largest pixel value. Thus using the set values b4 and s4 prevents the pixels having the maximum and minimum pixel values from being affected by noise when pixels of the fourth color contain noise.

In this manner, the difference value calculation circuits 105, 106, and 107 calculate the difference values D2, D3, and D4 of the second, third, and fourth colors, respectively, without being affected by noise, thereby estimating the fluctuation range of the neighboring pixels (or pixel variation).

The difference value calculation circuits 105, 106, and 107 output control signals C2, C3, and C4, respectively, to the correction circuit 110. The control signals C2, C3, and C4 tell the correction circuit 110 whether noise reduction is effective or ineffective.

The difference value calculation circuit 105 compares the difference value D2 and a threshold Th2. The difference value calculation circuit 105 then outputs the control signal C2 indicating that noise reduction is ineffective when the difference value D2 exceeds the threshold Th2, and otherwise the circuit 105 outputs the control signal C2 indicating that noise reduction is effective.

The difference value calculation circuit 106 compares the difference value D3 and a threshold Th3. The difference value calculation circuit 106 then outputs the control signal C3 indicating that noise reduction is ineffective when the difference value D3 exceeds the threshold Th3, and otherwise the circuit 106 outputs the control signal C3 indicating that noise reduction is effective.

The difference value calculation circuit 107 compares the difference value D4 and a threshold Th4. The difference value calculation circuit 107 then outputs the control signal C4 indicating that noise reduction is ineffective when the difference value D4 exceeds the threshold Th4, and otherwise the circuit 107 outputs the control signal C4 indicating that noise reduction is effective.

The thresholds Th2, Th3, and Th4 are previously stored in the set value storage register 120.

If all the control signals C2, C3, and C4 received from the difference value calculation circuits 105, 106, and 107, respectively, indicate that noise reduction is effective, then the correction circuit 110 performs noise reduction described as follows. On the other hand, if any of the received control signals C2, C3, and C4 indicates that noise reduction is ineffective, then the correction circuit 110 does not perform noise reduction, and outputs the pixel signal stored in the pixel storage unit 100 intact to the interpolation circuit 15. Thus, when any of the control signals C2, C3, and C4 indicates that noise reduction is ineffective, the pixels of any of the second, third, and fourth colors have high pixel variation. Therefore, the region having the pixel of interest P22 in the center can be determined to be the region with the high possibility of including a high-frequency component in the subject. Under such circumstances, the correction circuit 110 does not reduce the pixel value of the pixel of interest P22 but maintains the resolution feeling of the image.

<3-2. The Description of the Noise Reduction Process>

The maximum signal comparison circuit 111 determines whether the relation between the pixel value of the pixel of interest P22 stored in the pixel register 100a and the maximum pixel value of the pixels satisfies the Eq.1.

$$P22 > \max C + ThB \tag{Eq.1}$$

In the Eq.1, maxC represents the maximum pixel value of the pixels of the first color stored in the first array register 101, and ThB represents a maximum width threshold.

The maximum pixel value maxC indicates the (b1)th largest pixel value of the pixels of the first color stored in the first array register 101. The set value b1 and the threshold ThB are stored in the set value storage register 120.

For example, when the set value b1=2, the maximum pixel value maxC is the second largest pixel value of the pixels of the first color. Thus using the set value b1 can eliminate the effect of noise when pixels of the first color contain noise.

If the pixel value of the pixel of interest P22 exceeds the value obtained by adding the threshold ThB to the maximum pixel value maxC as shown in the Eq.1, this means that the pixel of interest P22 has an outstandingly large pixel value. In such cases, the maximum signal comparison circuit 111 outputs to the correction circuit 110 the control signal C11 indicating that the maximum signal comparison has been determined to be effective.

Upon receiving the control signal C11, the correction circuit 110 replaces the pixel value of the pixel of interest P22 by the maximum pixel value maxC as shown in the Eq.2.

$$P22 = \max C \tag{Eq.2}$$

On the other hand, when the Eq.1 is not satisfied, the maximum signal comparison circuit 111 outputs to the correction circuit 110 the control signal C11 indicating that the maximum signal comparison has been determined to be ineffective.

The minimum signal comparison circuit 112 determines whether the relation between the pixel value of the pixel of interest P22 stored in the pixel register 100a and the minimum pixel value of the pixels satisfies the Eq.3.

$$P22 < \min C - ThS \tag{Eq.3}$$

In the Eq.3, minC represents the minimum pixel value of the pixels of the first color stored in the first array register 101, and ThS represents a minimum width threshold.

The minimum pixel value minC indicates the (s1)th smallest pixel value of the pixels of the first color stored in the first array register 101. The set value s1 and the threshold ThS are stored in the set value storage register 120.

For example, when the set value s1=2, the minimum pixel value minC is the second smallest pixel value of the pixels of the first color. Thus using the set value s1 can eliminate the effect of noise when pixels of the first color contain noise.

If the pixel value of the pixel of interest P22 is smaller than the value obtained by subtracting the threshold ThS from the minimum pixel value minC as shown in the Eq.3, this means that the pixel of interest P22 has an outstandingly small pixel value. In such cases, the minimum signal comparison circuit 112 outputs to the correction circuit 110 the control signal C12 indicating that the minimum signal comparison has been determined to be effective.

Upon receiving the control signal C12, the correction circuit 110 replaces the pixel value of the pixel of interest P22 by the minimum pixel value minC as shown in the Eq.4.

$$P22 = \min C \tag{Eq.4}$$

On the other hand, when the Eq.3 is not satisfied, the minimum signal comparison circuit 112 outputs to the correction circuit 110 the control signal C12 indicating that the minimum signal comparison has been determined to be ineffective.

The limit signal comparison circuit 113 determines whether the pixel value of the pixel of interest P22 stored in the pixel register 100a satisfies the Eq.5.

$$P22 > LB \tag{Eq.5}$$

In the Eq.5, LB represents a signal upper limit. The signal upper limit LB is previously stored in the set value storage register 120. The pixel value set as the signal upper limit LB is close to a maximum value of the tonal range. If the pixel value of the pixel of interest P22 exceeds the signal upper limit LB as shown in the Eq.5, this means that the pixel of interest P22 has an extremely large pixel value, and is totally overexposed. In this case, it is determined whether the Eq.6 is satisfied.

$$P22 < \max C \quad (Eq.6)$$

When the pixel of interest P22 satisfies both the Eq.5 and Eq.6, the limit signal comparison circuit 113 determines that not only the pixel of interest P22 but also the neighboring pixels are totally overexposed. Therefore, the limit signal comparison circuit 113 outputs to the correction circuit 110 the control signal C13 indicating that the limit signal comparison has been determined to be effective also for the neighboring pixels.

Upon receiving the control signal C13, the correction circuit 110 does not correct the pixel value of the pixel of interest P22 but maintains the value.

On the other hand, when the Eq.5 is not satisfied, the limit signal comparison circuit 113 outputs to the correction circuit 110 the control signal C13 indicating that the limit signal comparison has been determined to be ineffective.

If the Eq.5 is satisfied, but the Eq.6 is not, the limit signal comparison circuit 113 determines that only the pixel of interest P22 is totally overexposed. Therefore, the limit signal comparison circuit 113 outputs to the correction circuit 110 the control signal C13 indicating that the limit signal comparison has been determined to be effective only for the pixel of interest.

Upon receiving the control signal C13, the correction circuit 110 replaces the pixel value of the pixel of interest P22 by the maximum pixel value maxC as shown in the Eq.7.

$$P22 = \max C \quad (Eq.7)$$

Even if the Eq.6 is not satisfied, there is a possibility that not only the pixel of interest P22 but also the neighboring pixels are totally overexposed. In such cases, replacing the pixel value of the pixel of interest P22 by the maximum pixel value maxC does not cause image degradation.

The limit signal comparison circuit 114 determines whether the pixel value of the pixel of interest P22 stored in the pixel register 100a satisfies the Eq.8.

$$P22 < LS \quad (Eq.8)$$

In the Eq.8, LS represents a signal lower limit. The signal lower limit LS is previously stored in the set value storage register 120. The pixel value set as the signal lower limit LS is close to a minimum value of the tonal range. If the pixel value of the pixel of interest P22 is smaller than the signal lower limit LS as shown in the Eq.8, this means that the pixel of interest P22 has an extremely small pixel value, and is totally underexposed. In this case, it is determined whether the Eq.9 is satisfied.

$$P22 > \min C \quad (Eq.9)$$

When the pixel of interest P22 satisfies both the Eq.8 and Eq.9, the limit signal comparison circuit 114 determines that not only the pixel of interest P22 but also the neighboring pixels are totally underexposed. Therefore, the limit signal comparison circuit 114 outputs to the correction circuit 110 the control signal C14 indicating that the limit signal comparison has been determined to be effective also for the neighboring pixels.

Upon receiving the control signal C14, the correction circuit 110 does not correct the pixel value of the pixel of interest P22, but remains the value.

On the other hand, when the Eq.8 is not satisfied, the limit signal comparison circuit 114 outputs to the correction circuit 110 the control signal C14 indicating that the limit signal comparison has been determined to be ineffective.

If the Eq.8 is satisfied, but the Eq.9 is not, the limit signal comparison circuit 114 determines that only the pixel of interest P22 is totally underexposed. Therefore, the limit signal comparison circuit 114 outputs to the correction circuit 110 the control signal C14 indicating that the limit signal comparison has been determined to be effective only for the pixel of interest.

Upon receiving the control signal C14, the correction circuit 110 replaces the pixel value of the pixel of interest P22 by the minimum pixel value minC as shown in the Eq.10.

$$P22 = \min C \quad (Eq.10)$$

Even if the Eq.9 is not satisfied, there is a possibility that not only the pixel of interest P22 but also the neighboring pixels are totally underexposed. In such cases, replacing the pixel value of the pixel of interest P22 by the minimum pixel value minC does not cause image degradation.

The correction circuit 110 does not correct the pixel value of the pixel of interest P22 but maintains the value upon receiving the following signals: the control signal C11 indicating that the maximum signal comparison has been determined to be ineffective from the maximum signal comparison circuit 111; the control signal C12 indicating that the minimum signal comparison has been determined to be ineffective from the minimum signal comparison circuit 112; the control signal C13 indicating that the limit signal comparison has been determined to be ineffective from the limit signal comparison circuit 113; and the control signal C14 indicating that the limit signal comparison has been determined to be ineffective from the limit signal comparison circuit 114.

<3-3. The Flow of the Noise Reduction Process>

Figure 8:
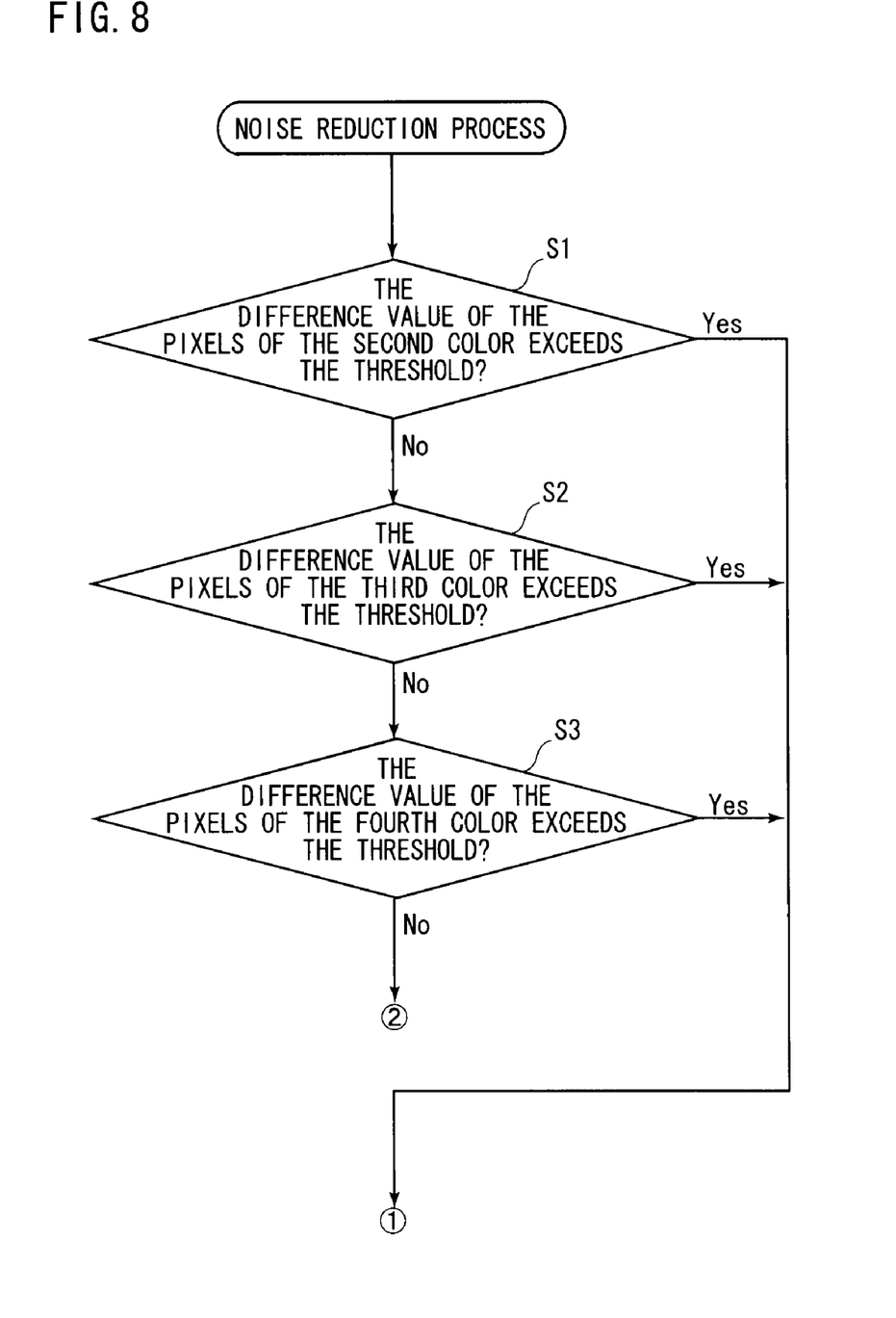
FIG. 8 is a flowchart of a noise reduction process.
Figure 9:
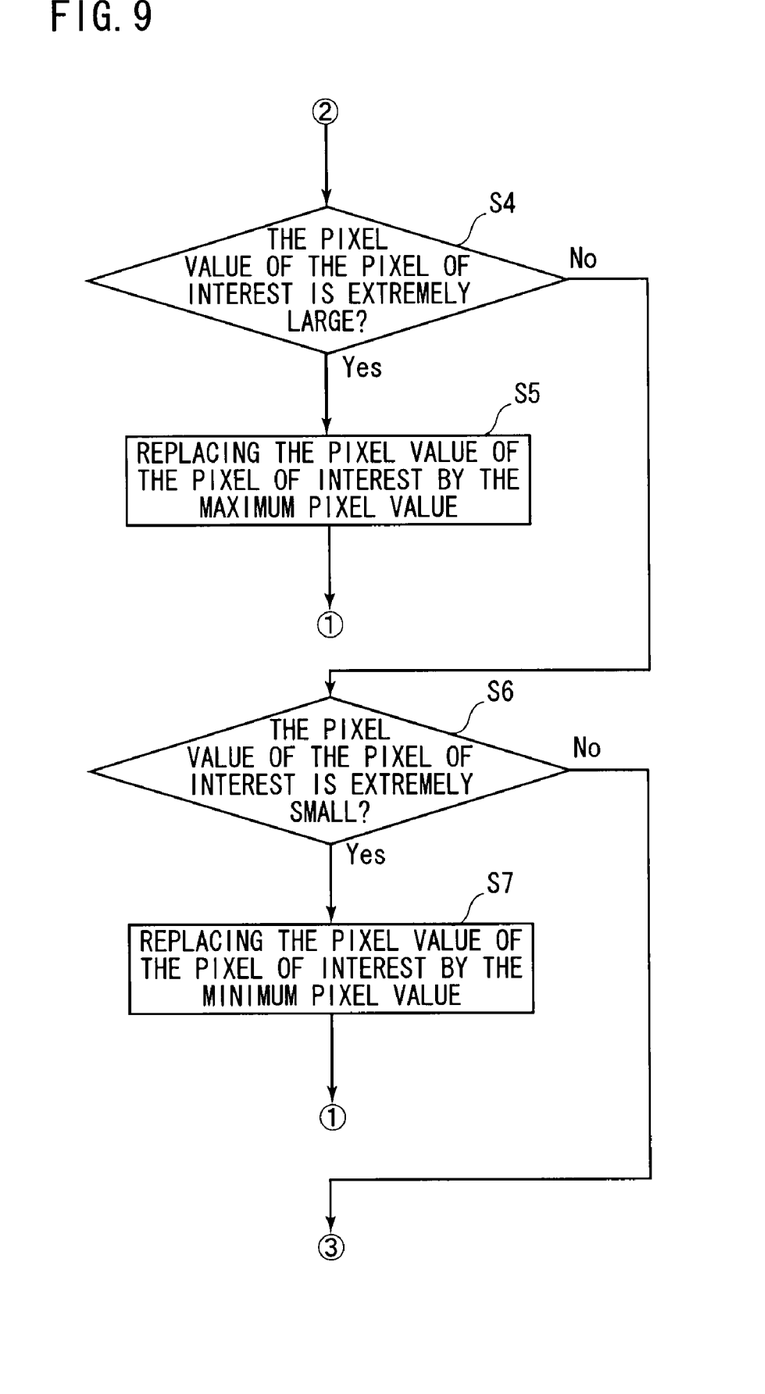
FIG. 9 is another flowchart of the noise reduction process.
Figure 10:
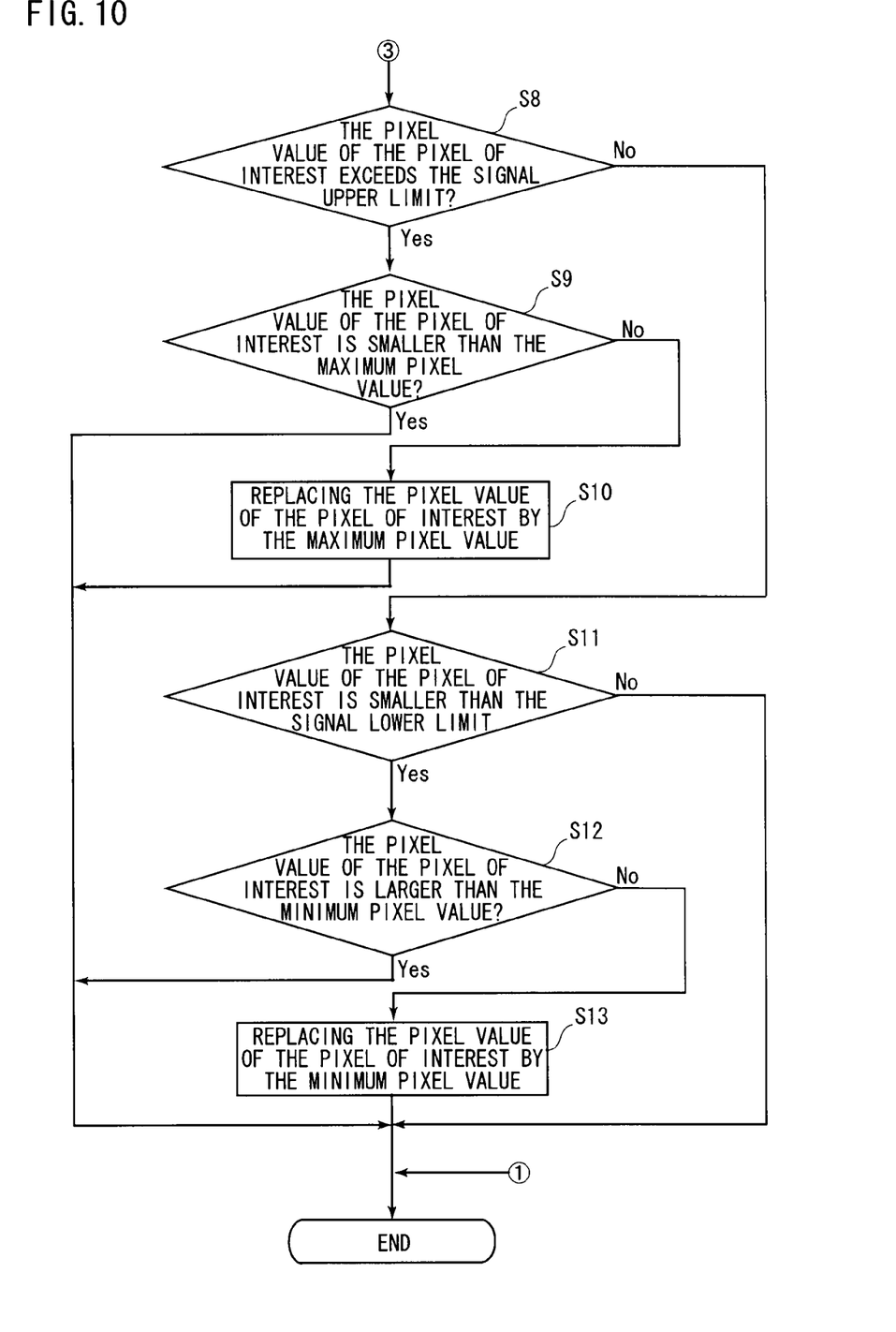
FIG. 10 is another flowchart of the noise reduction process.

The flow of the process for enabling the above-described noise reduction and of the noise reduction process will be described with reference to the flowcharts of FIGS. 8, 9, and 10.

First, the difference value calculation circuit 105 determines whether the difference value D2 of the pixels of the second color exceeds the threshold Th2 (Step S1).

When the difference value D2 does not exceed the threshold Th2 (No in Step S1), that is, when signal value variation of the pixels of the second color is determined to be not so large, the difference value calculation circuit 106 determines whether the difference value D3 of the pixels of the third color exceeds the threshold Th3 (Step S2).

When the difference value D3 does not exceed the threshold Th3 (No in Step S2), that is, when signal value variation of the pixels of the third color is determined to be not so large, the difference value calculation circuit 107 determines whether the difference value D4 of the pixels of the fourth color exceeds the threshold Th4 (Step S3).

When the difference value D4 does not exceed the threshold Th4 (No in Step S3), that is, when signal value variation of the pixels of the fourth color is determined to be not so large, the correction circuit 110 makes noise reduction effective and performs noise reduction in Step S4 and subsequent steps. In other words, the pixels which have any of the three colors different from the color of the pixel of interest and which are in the vicinity of the pixel of interest are estimated to have pixel signal variation lower than the thresholds. As a result, it is determined that it is effective to apply noise reduction to the pixel of interest.

On the other hand, if any of the difference values D2, D3, and D4 exceeds the threshold Th2, Th3, or Th4 (Yes in any of Step S1, S2, or S3), the correction circuit 110 makes noise reduction ineffective. In other words, the pixels which have any of the three colors different from the color of the pixel of interest and which are in the vicinity of the pixel of interest are estimated to have pixel signal variation higher than the threshold. As a result, the region in the vicinity of the pixel of interest can be determined to have high pixel variation and a high possibility of including a high-frequency component in the subject. Therefore, noise reduction is not applied to the pixel of interest P22 but maintains the resolution feeling.

Next, it is determined whether the pixel value of the pixel of interest P22 is extremely large (Step S4). In other words, the maximum signal comparison circuit 111 determines whether the Eq.1 is satisfied. When the pixel value of the pixel of interest P22 is outstandingly large (Yes in Step S4), the correction circuit 110 replaces the pixel value of the pixel of interest P22 by the maximum pixel value maxC (Step S5). Thus, if outstandingly large, the pixel value of the pixel of interest P22 is replaced by the pixel value of the rank specified by the set value b1.

When noise components are contained in the pixel having the largest pixel value in the arrangement of the first color, the maximum pixel value maxC can be properly selected by selecting the second largest or smaller pixel value using the set value b1. Furthermore, the use of the threshold ThB prevents the pixel value of the pixel of interest P22 from being corrected when it slightly larger than the maximum pixel value maxC, thereby maintaining the resolution feeling.

When the Eq.1 is not satisfied (No in Step S4), it is determined whether the pixel value of the pixel of interest P22 is extremely small (Step S6). In other words, the minimum signal comparison circuit 112 determines whether the Eq.3 is satisfied. When the pixel value of the pixel of interest P22 is extremely small (Yes in Step S6), the correction circuit 110 replaces the pixel value of the pixel of interest P22 by the minimum pixel value minC (Step S7). Thus, if outstandingly small, the pixel value of the pixel of interest P22 is replaced by the pixel value of the rank specified by the set value s1.

When noise components are contained in the pixel having the smallest pixel value in the arrangement of the first color, the minimum pixel value minC can be properly selected by selecting the second smallest or larger pixel value using the set value s1. Furthermore, the use of the threshold ThS prevents the pixel value of the pixel of interest P22 from being corrected when it is slightly smaller than the minimum pixel value minC, thereby maintaining the resolution feeling.

When the Eq.3 is not satisfied (No in Step S6), it is determined whether the pixel value of the pixel of interest P22 exceeds the signal upper limit LB (Step S8). In other words, the limit signal comparison circuit 113 determines whether the Eq.5 is satisfied.

When the pixel value of the pixel of interest P22 exceeds the signal upper limit LB (Yes in Step S8), it is further determined whether the pixel value of the pixel of interest P22 is smaller than the maximum pixel value maxC (Step S9). In other words, the limit signal comparison circuit 113 determines whether the Eq.6 is satisfied.

When the pixel value of the pixel of interest P22 is not smaller than the maximum pixel value maxC (No in Step S9), the correction circuit 110 replaces the pixel value of the pixel of interest P22 by the maximum pixel value maxC as shown in the Eq.7 (Step S10). Thus, when only the pixel of interest is determined to be totally overexposed, the pixel value can be replaced by the maximum pixel value maxC to reduce noise.

In Step S4, the degree of prominence of the pixel of interest is estimated using the threshold ThB. However, the estimation using the threshold ThB is not appropriate for the region in which the pixel value is close to the maximum value of the tonal range. The reason for this is that in such regions, a small difference in the signal value greatly affects image quality, or the addition of the threshold ThB to the maximum pixel value maxC may result in a pixel value larger than the maximum gradation value, making the condition of the determination using the threshold ThB not effective. This is why the signal upper limit LB is used to reduce noise in a high gradation region.

When the pixel value of the pixel of interest P22 does not exceed the signal upper limit LB (No in Step S8), it is determined whether the pixel value of the pixel of interest P22 is smaller than the signal lower limit LS (Step S11). In other words, the limit signal comparison circuit 114 determines whether the Eq.8 is satisfied.

When the pixel value of the pixel of interest P22 is smaller than the signal lower limit LS (Yes in Step S11), it is further determined whether the pixel value of the pixel of interest P22 is larger than the minimum pixel value minC (Step S12). In other words, the limit signal comparison circuit 114 determines whether the Eq.9 is satisfied.

When the pixel value of the pixel of interest P22 is not larger than the minimum pixel value minC (No in Step S12), the correction circuit 110 replaces the pixel value of the pixel of interest P22 by the minimum pixel value minC as shown in the Eq.10 (Step S13). Thus, when only the pixel of interest is determined to be totally underexposed, the pixel value can be replaced by the minimum pixel value minC to reduce noise.

In Step S6, the degree of prominence of the pixel of interest is estimated using the threshold ThS. However, the estimation using the threshold ThS is not appropriate for the region in which the pixel value is close to the minimum value of the tonal range. The reason for this is that in such regions, a small difference in the signal value greatly affects image quality, or the subtraction of the threshold ThS from the minimum pixel value minC may result in a pixel value smaller than the minimum gradation value, making the condition of the determination using the threshold ThS not effective. This is why the signal lower limit LS is used to reduce noise in a low gradation region.

On the other hand, when the pixel value of the pixel of interest P22 exceeds the signal upper limit LB (Yes in Step S8), and is smaller than the maximum pixel value maxC (Yes in Step S9), it is determined that the neighboring pixels are also totally overexposed. Thus, the correct information is that the pixel of interest P22 is not noise and that both the pixel of interest P22 and its neighboring pixels are totally overexposed. Therefore, the correction circuit 110 does not correct the pixel value of the pixel of interest P22 but maintains the signal value.

When the pixel value of the pixel of interest P22 is smaller than the signal lower limit LS (Yes in Step S11) and is larger than the minimum pixel value minC (Yes in Step S12), it is determined that the neighboring pixels are also totally underexposed. Thus the correct information is that the pixel of interest P22 is not noise and that both the pixel of interest P22 and its neighboring pixels are totally underexposed. Therefore, the correction circuit 110 does not correct the pixel value of the pixel of interest P22 but maintains the signal value.

If any of Steps S4, S6, S8, and S11 is not satisfied, it is determined that the pixel of interest P22 does not need noise reduction and holds the correct image information of the subject. Therefore, the correction circuit 110 does not correct the pixel value of the pixel of interest P22 but maintains the signal value.

According to the noise reduction circuit 14 of the embodiment, noise in pixel signals can be reduced while maintaining the resolution feeling of the image. Therefore, even a high-definition image pickup device can generate image of a high resolution feeling.

While the invention has been shown and described in detail, the foregoing description is in all aspects illustrative and not restrictive. It is therefore understood that numerous modifications and variations can be devised without departing from the scope of the invention.

What is claimed is:

1. A noise reduction device for receiving a pixel signal of a predetermined color space having one color component per pixel and for reducing noise in a pixel of interest, said noise reduction device comprising:
   an element for previously setting a highest rank of a same color as said pixel of interest;
   an element for acquiring neighboring pixels of the same color as said pixel of interest, said neighboring pixels of the same color being located within a predetermined vicinity of said pixel of interest;
   an element for storing an arrangement of said neighboring pixels of the same color sorted according to a size of the pixel value; and
   a correction element for replacing a pixel value of said pixel of interest by a pixel value of said highest rank of the same color when the pixel value of said pixel of interest is larger by a maximum width threshold than the pixel value of said highest rank of the same color in the arrangement of said neighboring pixels of the same color.

2. The noise reduction device according to claim 1, further comprising:
   an element for previously setting a signal upper limit, wherein:
   said correction element includes an element for maintaining the pixel value of said pixel of interest when the pixel value of said pixel of interest is larger than said signal upper limit and is smaller than the pixel value of the highest rank of the same color in the arrangement of said neighboring pixels of the same color.

3. The noise reduction device according to claim 2, wherein:
   said correction element includes an element for replacing the pixel value of said pixel of interest by the pixel value of the highest rank of the same color in the arrangement of said neighboring pixels of the same color when the pixel value of said pixel of interest is larger than said signal upper limit and is equal to or larger than the pixel value of the highest rank of the same color in the arrangement of said neighboring pixels of the same color.

4. The noise reduction device according to claim 1, comprising:
   an element for previously setting a highest rank and a lowest rank of a different color from said pixel of interest;
   an element for acquiring neighboring pixels of the different color from said pixel of interest, said neighboring pixels of the different color being located within a predetermined vicinity of said pixel of interest; and
   an element for storing an arrangement of said neighboring pixels of the different color sorted according to a size of the pixel value, wherein:
   the pixel value of said pixel of interest is not corrected by said correction element but maintained when a difference value between the pixel value of said highest rank of the different color and the pixel value of said lowest rank of the different color in the arrangement of said neighboring pixels of the different color is larger than a dynamic threshold.

5. The noise reduction device according to claim 4, wherein:
   said highest rank of the different color and said lowest rank of the different color are set individually for each of a plurality of different colors from said pixel of interest,
   difference values obtained for said plurality of different colors are compared with said dynamic thresholds set for each of said plurality of different colors, and
   when any of said difference values is larger than the corresponding one of said dynamic thresholds, the pixel value of said pixel of interest is maintained.

6. A noise reduction device for receiving a pixel signal of a predetermined color space having one color component per pixel and for reducing noise in a pixel of interest, said noise reduction device comprising:
   an element for previously setting a lowest rank of a same color as said pixel of interest;
   an element for acquiring neighboring pixels of the same color as said pixel of interest, said neighboring pixels of the same color being located within a predetermined vicinity of said pixel of interest;
   an element for storing an arrangement of said neighboring pixels of the same color sorted according to a size of the pixel value; and
   a correction element for replacing a pixel value of said pixel of interest by a pixel value of said lowest rank of the same color when the pixel value of said pixel of interest is smaller by a minimum width threshold than the pixel value of said lowest rank of the same color in the arrangement of said neighboring pixels of the same color.

7. The noise reduction device according to claim 6, further comprising:
   an element for previously setting a signal lower limit, wherein:
   said correction element includes an element for maintaining the pixel value of said pixel of interest when the pixel value of said pixel of interest is smaller than said signal lower limit and is larger than the pixel value of the lowest rank of the same color in the arrangement of said neighboring pixels of the same color.

8. The noise reduction device according to claim 7, wherein:
   said correction element includes an element for replacing the pixel value of said pixel of interest by the pixel value of the lowest rank of the same color in the arrangement of said neighboring pixels of the same color when the pixel value of said pixel of interest is smaller than said signal lower limit and is equal to or smaller than the pixel value of the lowest rank of the same color in the arrangement of said neighboring pixels of the same color.

9. The noise reduction device according to claim 6, comprising:
   an element for previously setting a highest rank and a lowest rank of a different color from said pixel of interest;
   an element for acquiring neighboring pixels of the different color from said pixel of interest, said neighboring pixels of the different color being located within a predetermined vicinity of said pixel of interest; and
   an element for storing an arrangement of said neighboring pixels of the different color sorted according to a size of the pixel value, wherein:

the pixel value of said pixel of interest is not corrected by said correction element but maintained when a difference value between the pixel value of said highest rank of the different color and the pixel value of said lowest rank of the different color in the arrangement of said neighboring pixels of the different color is larger than a dynamic threshold.

10. The noise reduction device according to claim 9, wherein:
said highest rank of the different color and said lowest rank of the different color are set individually for each of a plurality of different colors from said pixel of interest,
difference values obtained for said plurality of different colors are compared with said dynamic thresholds set for each of said plurality of different colors, and
when any of said difference values is larger than the corresponding one of said dynamic thresholds, the pixel value of said pixel of interest is maintained.

11. A noise reduction device for receiving a pixel signal of a predetermined color space having one color component per pixel and for reducing noise in a pixel of interest, said noise reduction device comprising:
an element for previously setting a highest rank and a lowest rank of a different color from said pixel of interest;
an element for acquiring neighboring pixels of the different color from said pixel of interest, said neighboring pixels of the different color being located within a predetermined vicinity of said pixel of interest; and
an element for storing an arrangement of said neighboring pixels of the different color sorted according to a size of the pixel value, wherein:
noise reduction is not applied to said pixel of interest and the pixel value of said pixel of interest is maintained when a difference between the pixel value of said highest rank of the different color and the pixel value of said lowest rank of the different color in the arrangement of said neighboring pixels of the different color is larger than a dynamic threshold.

12. The noise reduction device according to claim 11, wherein:
said highest rank of the different color and said lowest rank of the different color are set individually for each of a plurality of different colors from said pixel of interest,
said difference values obtained for said plurality of different colors are compared with said dynamic thresholds set for each of said plurality of different colors, and
when any of said difference values is larger than the corresponding one of said dynamic thresholds, the pixel value of said pixel of interest is maintained.

13. A digital camera comprising:
an input element for receiving a pixel signal of a predetermined color space having one color component per pixel; and
a noise reduction device for reducing noise in a pixel of interest contained in the pixel signal received by said input element, wherein;
said noise reduction device comprising:
an element for previously setting a highest rank of a same color as said pixel of interest;
an element for acquiring neighboring pixels of the same color as said pixel of interest, said neighboring pixels of the same color being located within a predetermined vicinity of said pixel of interest;
an element for storing an arrangement of said neighboring pixels of the same color sorted according to a size of the pixel value; and
a correction element for replacing a pixel value of said pixel of interest by a pixel value of said highest rank of the same color when the pixel value of said pixel of interest is larger by a maximum width threshold than the pixel value of said highest rank of the same color in the arrangement of said neighboring pixels of the same color.

14. A digital camera comprising:
an input element for receiving a pixel signal of a predetermined color space having one color component per pixel; and
a noise reduction device for reducing noise in a pixel of interest contained in the pixel signal received by said input element, wherein;
said noise reduction device comprising:
an element for previously setting a lowest rank of a same color as said pixel of interest;
an element for acquiring neighboring pixels of the same color as said pixel of interest, said neighboring pixels of the same color being located within a predetermined vicinity of said pixel of interest;
an element for storing an arrangement of said neighboring pixels of the same color sorted according to a size of the pixel value; and
a correction element for replacing a pixel value of said pixel of interest by a pixel value of said lowest rank of the same color when the pixel value of said pixel of interest is smaller by a minimum width threshold than the pixel value of said lowest rank of the same color in the arrangement of said neighboring pixels of the same color.

15. A digital camera comprising:
an input element for receiving a pixel signal of a predetermined color space having one color component per pixel; and
a noise reduction device for reducing noise in a pixel of interest contained in the pixel signal received by said input element, wherein;
said noise reduction device comprising:
an element for previously setting a highest rank and a lowest rank of a different color from said pixel of interest;
an element for acquiring neighboring pixels of the different color from said pixel of interest, said neighboring pixels of the different color being located within a predetermined vicinity of said pixel of interest; and
an element for storing an arrangement of said neighboring pixels of the different color sorted according to a size of the pixel value, wherein:
noise reduction is not applied to said pixel of interest and the pixel value of said pixel of interest is maintained when a difference between the pixel value of said highest rank of the different color and the pixel value of said lowest rank of the different color in the arrangement of said neighboring pixels of the different color is larger than a dynamic threshold.

* * * * *